United States Patent [19]

Kennedy

[11] Patent Number: 4,924,987
[45] Date of Patent: May 15, 1990

[54] PUMP PLATE ASSEMBLY FOR A VISCOUS FLUID CLUTCH

[75] Inventor: Lawrence C. Kennedy, Kettering, Ohio

[73] Assignee: General Motors Corporation, Detroit, Mich.

[21] Appl. No.: 355,535

[22] Filed: May 22, 1989

[51] Int. Cl.$^5$ .............................................. F16D 33/12
[52] U.S. Cl. ................................ 192/58 B; 192/82 T
[58] Field of Search ......................... 192/82 T, 58 B; 123/41.12

[56] References Cited

U.S. PATENT DOCUMENTS

| | | | |
|---|---|---|---|
| 3,174,600 | 3/1965 | Oldberg | 192/58 B |
| 3,323,623 | 6/1967 | Roper | 192/58 B |
| 3,339,689 | 9/1967 | Sutaruk | 192/58 B |
| 3,419,122 | 12/1968 | Connelly | 192/58 B |
| 3,490,686 | 1/1970 | Weir | 192/82 T |
| 4,190,139 | 2/1980 | Tinholt et al. | 192/58 B |
| 4,271,946 | 6/1981 | Bridge | 192/58 B |
| 4,312,433 | 1/1982 | Bopp | 192/58 B |
| 4,531,621 | 1/1985 | Hazel | 192/58 B |
| 4,544,053 | 10/1985 | Yamaguchi et al. | 192/82 T |
| 4,564,094 | 1/1986 | Storz | 192/58 B |
| 4,570,771 | 2/1986 | Yamaguchi et al. | 192/82 T |
| 4,606,445 | 8/1986 | Rockey | 192/58 B |

FOREIGN PATENT DOCUMENTS 2099960A 12/1982 United Kingdom .

Primary Examiner—Rodney H. Bonck
Assistant Examiner—Nicholas Whitelaw
Attorney, Agent, or Firm—A. Michael Tucker

[57] ABSTRACT

A fan clutch assembly for a vehicle includes a pump plate assembly for separating a receiving chamber from a reservoir, wherein the receiving chamber receives fluid from a shear zone. The pump plate assembly includes an orifice for permitting the passage of fluid from the receiving chamber to the reservoir. A check valve is provided at the orifice to control the flow of fluid and permit only one-way flow from the receiving chamber into the reservoir. The check valve eliminates the migration of fluid through the orifice from the reservoir into the receiving chamber.

2 Claims, 3 Drawing Sheets

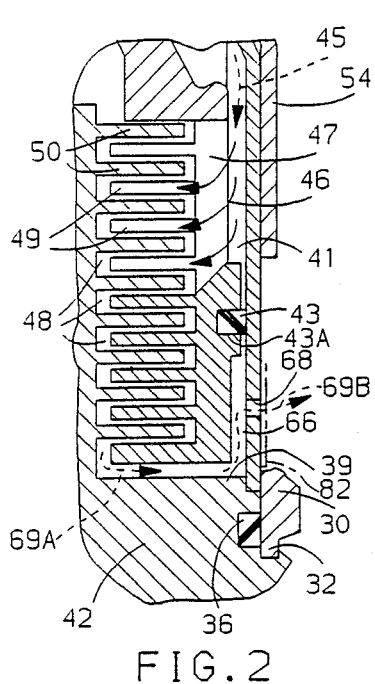
FIG. 2
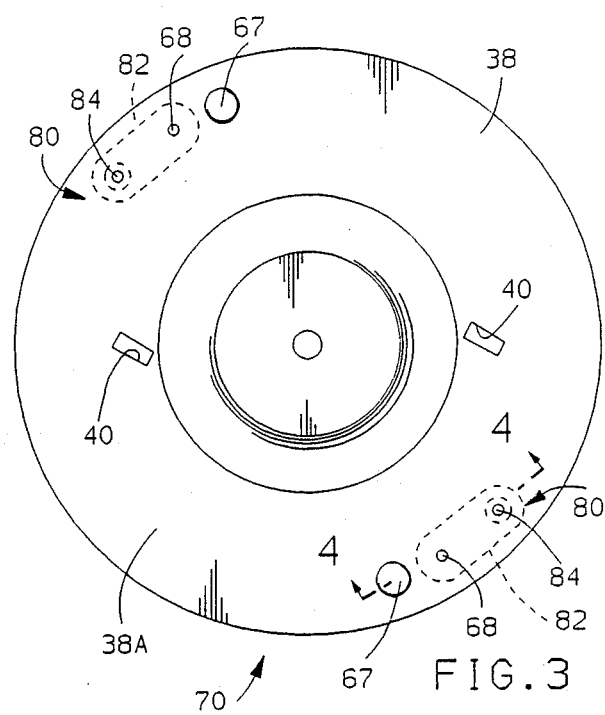
FIG. 3
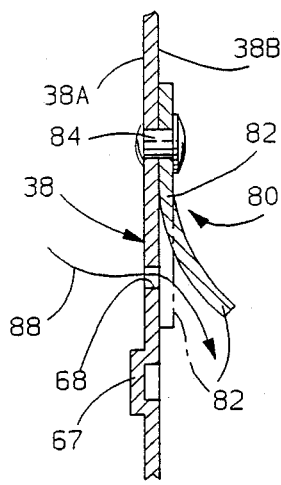
FIG. 4
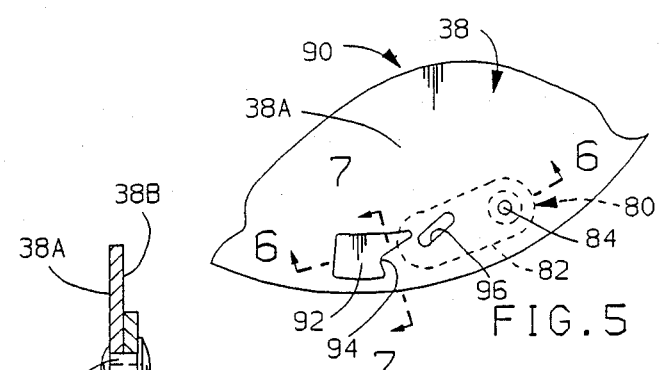
FIG. 5
FIG. 6
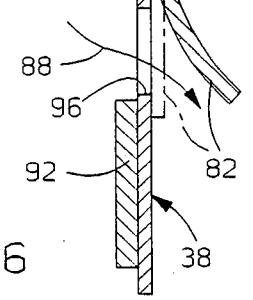
FIG. 6
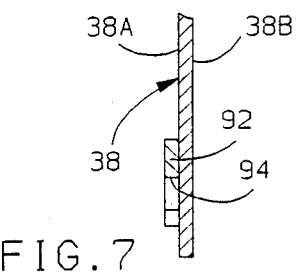
FIG. 7

PUMP PLATE ASSEMBLY FOR A VISCOUS FLUID CLUTCH

BACKGROUND OF THE INVENTION

1. Field of the Invention

The present invention relates generally to a viscous fluid coupling device. In particular, the present invention is concerned with a pump plate assembly of a viscous fluid fan clutch for a vehicle.

2. Statement of the Related Art

A thermostatically-controlled viscous fluid clutch assembly for driving and rotating a vehicle cooling fan is well-known. A multi-bladed fan is removably secured to a body of the clutch assembly. The fan and clutch assembly are installed between an accessory pulley of a vehicle engine (typically the water pump pulley) and a radiator. The clutch assembly drives the fan at high speeds close to input speed when cooling is required and permits the fan to rotate at low speeds when cooling is not required. Thermostatic control of the fan through the clutch assembly reduces the load on an engine and the noise caused by fan rotation, resulting in horsepower gain and improved fuel economy.

Generally, a clutch plate, housed within the clutch assembly, having lands and grooves is mated to the body having complementary lands and grooves. A pump plate separates a pair of internally-contained chambers, a receiving chamber and a collecting chamber, from a reservoir. Gates in the pump plate permit selective flow of a viscous fluid from the reservoir to the receiving chamber and into a shear zone between the lands and grooves of the body and clutch plate. Fluid shear in the lands and grooves transfers input torque from the clutch plate to drive the body and the attached fan.

When cooling is not required, gates in the pump plate are closed and the fluid in the shear zone is pumped into the receiving chamber. Orifices in the pump plate permit passage of the fluid from the receiving chamber into the reservoir. The removal of a majority of the fluid from the shear zone substantially reduces the shear between the clutch plate and the body, thereby substantially reducing the rotation of the fan.

When an engine is not running, fluid in the reservoir may settle at an equilibrium level in a conventional clutch assembly. Fluid pressure may cause the migration of fluid from the reservoir into the receiving chamber through the pump plate orifices and into the shear zone. When an engine is next started, fluid that has migrated into the shear zone results in annoying high-speed operation of the fan. Such high-speed operation creates unwanted noise from the fan blades. Also, excessive rotation of the fan of a cold engine increases the engine warm-up period.

The art continues to seek improvements. It is desirable that a viscous fluid clutch assembly provide thermostatic operation of a fan when cooling is required. Furthermore, it is desirable that a clutch assembly prevent the migration of fluid from a reservoir to the shear zone when the engine is not in operation, thereby eliminating high-speed operation and unwanted fan noise when a cold engine is started.

SUMMARY OF THE INVENTION

The present invention includes a viscous fluid drive device particularly adaptable for a fan clutch assembly of a vehicle. The present fan clutch assembly utilizes a check valve to prevent the migration of fluid through a pump plate orifice from a reservoir into a receiving chamber, particularly when the engine is not running.

The present invention includes a fan clutch assembly for a vehicle. The clutch assembly includes a pump plate assembly for separating a collecting chamber and a receiving chamber from a reservoir. The pump plate assembly includes an orifice for permitting the passage of fluid from the receiving chamber to the reservoir. A check valve is provided at the orifice to control the flow of fluid and permit only one-way flow from the receiving chamber into the reservoir. The check valve eliminates the migration of fluid through the orifice from the reservoir into the receiving chamber.

In various embodiments, the pump plate assembly includes a flapper valve, an umbrella valve and a duckbill valve. Various configurations of wiper pump elements and orifices to enhance the flow of fluid through the pump plate check valve are disclosed.

BRIEF DESCRIPTION OF THE DRAWINGS

FIG. 2 is an enlarged view of a portion of the clutch assembly of FIG. 1 wherein the pump plate has been rotated and parts removed to illustrate fluid flow from a receiving chamber through a pump plate orifice.

FIG. 3 is a top plan view of a first embodiment of the present pump plate assembly removed from the clutch assembly of FIG. 1 and illustrating a flapper valve assembly.

FIG. 4 is an enlarged sectional view taken along line 4—4 of FIG. 3 illustrating fluid flow through the flapper valve assembly.

FIG. 5 is a partial top plan view of a second embodiment of the present pump plate assembly illustrating a wiper pump having a scoop surface, an orifice formed by a slot and a flapper valve assembly.

FIG. 6 is an enlarged sectional view taken along line 6—6 of FIG. 5 illustrating fluid flow through the flapper valve assembly.

FIG. 7 is an enlarged section view taken along line 7—7 of FIG. 5.

DETAILED DESCRIPTION OF THE PREFERRED EMBODIMENTS

Figure 1:
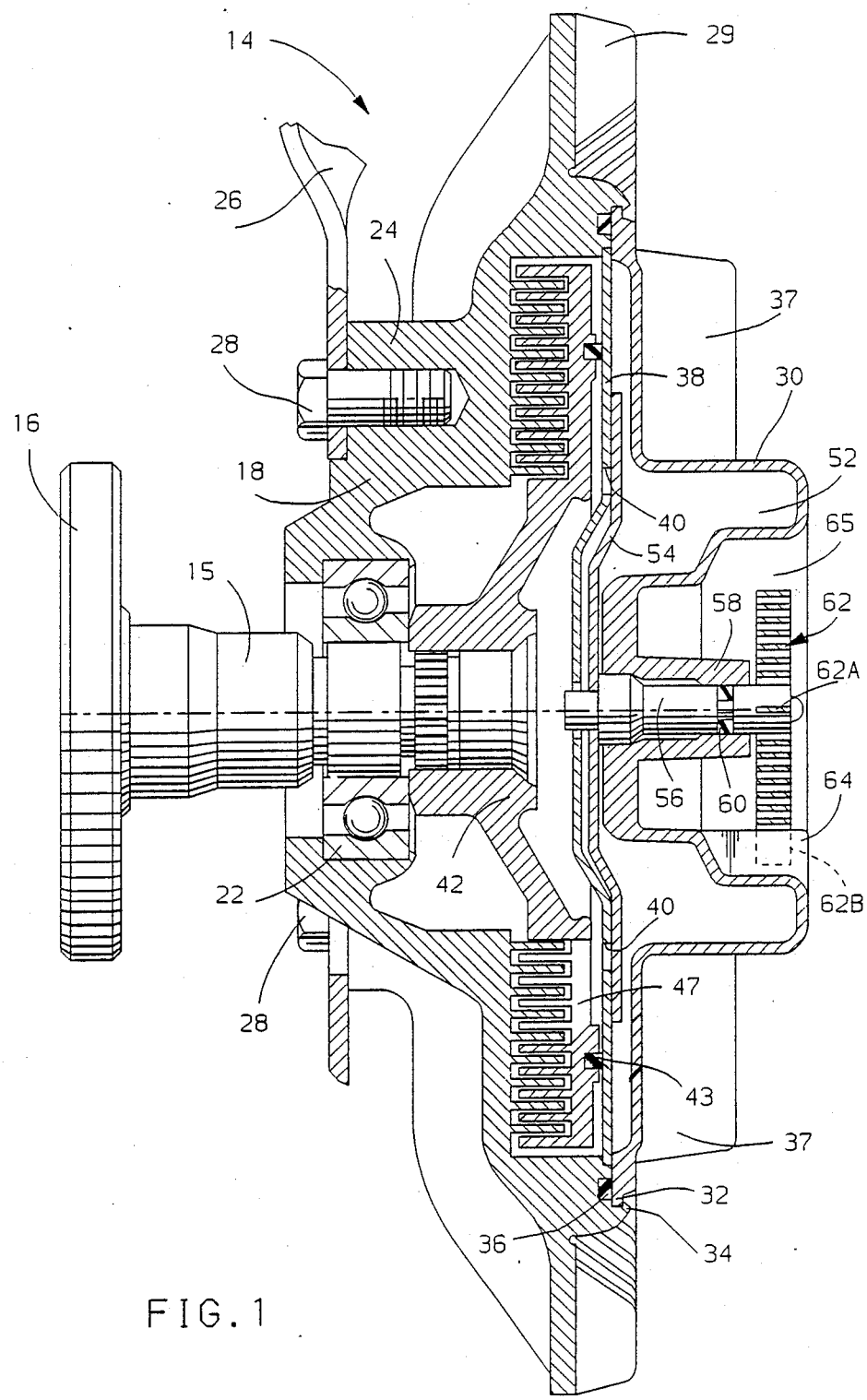
FIG. 1 is a sectional view of a viscous fluid fan clutch and blade assembly incorporating a pump plate assembly of the present invention.

FIG. 1 illustrates a multi-bladed fan and clutch assembly, indicated generally at 14, for drawing cooling air through the core of a vehicle radiator (not illustrated) through which engine cooling fluid is circulated. The fan and clutch assembly 14 is mounted on the outboard end of a rotatably driven shaft 15 whose inboard end terminates in a flange 16 which can be secured to a conventional engine-driven water pump pulley (not illustrated). The fan and clutch assembly 14 includes a dished main body 18 centrally mounted for rotation on shaft 15 by a bearing 22. The main body 18 is formed with a plurality of radially extending bosses 24 to which a multi-bladed fan 26 (partially illustrated in FIG. 1) is attached by threaded fasteners 28. A plurality of fins 29 is provided on the outer surface of the main body 18 to dissipate heat transferred from a viscous fluid housed by the assembly 14.

A cover plate 30 is mounted to a front face of and cooperates with the main body 18 to form a housing and reservoir as described below. The cover plate 30 is a dished member whose annular outer edge 32 is secured to the main body 18 by an annular retainer lip 34 spun over from the material of the main body 18. An annular seal 36, e.g., a formed-in-place gasket, is interposed between the edge 32 and the front face of the main body 18 to prevent leakage of the fluid from the interior of the assembly 14. A plurality of fins 37 is provided on the outer surface of the cover plate 30 to dissipate heat transferred from the fluid.

Disposed behind the cover plate 30 is a disk-like annular pump plate 38 whose diameter is slightly less than that of the cover plate 30. The pump plate 38 is drivingly secured to the main body 18 as it is trapped on an annular shoulder 39 (FIG. 2) on the main body 18 by the cover plate 30.

The pump plate 38 has a pair of diametrically opposed passages or gates 40 provided in its central portion. When opened, gates 40 allow the fluid to flow into a collecting chamber 41 (illustrated best in FIG. 2) formed and bounded by the pump plate 38, a clutch plate 42 and a divider ring 43. The clutch plate 42 is splined on shaft 15 at a central opening and provides for the hydraulic drive of the main body 18 and attached fan 26 as described below. Ring 43, preferably formed from TEFLON, is mounted in an annular groove 43A in the outer or front face of the clutch plate 42 and improves pump-out or clutch disengagement as described below. A divider ring of this type is described in U.S. Pat. No. 4,741,421, issued May 3, 1988, assigned to the assignee of this invention and hereby incorporated by reference.

As illustrated in FIG. 2, the centrifugal forces of the rotating assembly 14 force the axial fluid flow through gate 40 to radial fluid flow as indicated by directional arrows 45 into the collecting chamber 41.

Axial flow fluid, as indicated by directional arrows 46, is forced through well-known passages 47 in the clutch plate 42 into an annular serpentine fluid shear zone 48 formed by the grooves or spaces between interleaved concentric annular ridges or lands 49 formed in a rear face of a clutch plate 42 and complementary concentric annular ridges or lands 50 formed on an interior surface of the main body 18.

Fluid sheared in the shear zone 48 transmits input torque from the rotatably driven clutch plate 42, centrally splined on shaft 15, to provide for the hydraulic drive of main body 18 and the attached bladed fan 26 for cooling fan operation. Due to slippage between the clutch plate 42 and the main body 18, the fan speed is always less than the input speed from the shaft 15.

A reservoir 52 formed between the cover plate 30 and the pump plate 38 contains a specified quantity of viscous fluid. The opening and closing of the gates 40 to control the supply of the fluid into the collecting chamber 41 is provided by a valve plate 54 that extends from driving connection with a center shaft 56 rotatably mounted in a tubular hub portion 58 formed in the central portion of the cover plate 30. An O-ring seal 60 is mounted in an annular groove in the center shaft 56 and makes peripheral contact with the inner wall of the hub portion 58 to prevent fluid leakage to the exterior of the assembly 14.

A helically-wound bimetallic thermostatic valve control element 62 includes an inner end portion 62A mounted in a transverse slot formed in a forward end of the center shaft 56 and an outer end portion 62B mounted in a retaining tab 64 formed in the cover plate 30. Preferably, valve control element 62 is recessed within a cavity 65 surrounding the hub portion 58. Through this construction, an increase or decrease in ambient air temperature causes the winding or unwinding of the valve control element 62, resulting in rotation of the center shaft 56 and the attached valve plate 54. The actuation of valve plate 54 to control the opening and closing of gates 40 is well-known and described in U.S. Pat. No. 4,741,421 and hereby incorporated by reference.

In FIG. 2, fluid indicated by directional arrow 69A, is forced radially outwardly by centrifugal forces and exits the shear zone 48 into a receiving chamber 66 formed and bounded by the pump plate 38, the clutch plate 42 and the divider ring 43. Fluid indicated by directional arrow 69B exits the receiving chamber 66 through orifices 68 in the pump plate 38 in a well-known manner.

In a first preferred embodiment illustrated best in FIGS. 3 and 4, a pump plate assembly, indicated generally at 70, includes a pair of wiper pump elements 67 provided in a rear surface 38A, i.e., the surface in communication with the receiving chamber 66, of the pump plate 38 outbound of the divider ring 43. For balance, it is preferred that the wiper pumps 67 are diametrically opposed from each other. In other embodiments of pump plate assembly 70, a plurality of wiper pumps 67 can be provided on the pump plate 38. Wiper pumps 67 can be formed by any suitable means, e.g., as cylindrical, projecting elements stamped or pressed into the pump plate 38. Adjacent each wiper pump 67, a discharge orifice 68 is provided in the pump plate 38. The differential rotational speed between the pump plate 38 and the clutch plate 42 increases fluid pressure upstream of each wiper pump 67, resulting in the pumping of fluid through the orifices 68 back into the reservoir 52 in a well-known manner. Orifices 68 can be formed by punching or any other suitable means.

A flapper valve assembly, indicated generally at 80, is provided on the pump plate assembly 70 at each orifice 68. A thin, flat arm 82 is secured at a first end to a front surface 38B, i.e. the surface in communication with the reservoir 52, of the pump plate 38 by any suitable means, e.g. a rivet 84. The arm 82 lies flat against the front surface 38B (as illustrated by dotted lines in FIG. 4) and is positioned so that its second end completely covers and seals orifice 68. Preferably, arm 82 is constructed from a flexible and resilient material such as plastic or mylar. If desired, a mat (not illustrated), formed from a material for improving the seal provided by arm 82, can be provided on the front surface 38B of pump plate 38 around each orifice 68.

As pressure in the receiving chamber 66 increases, fluid as indicated by directional arrow 88 in FIG. 4 is pumped from the receiving chamber 66 through the flapper valve assembly 80 into the reservoir 52. Arm 82 resiliently deflects to permit the one-way passage of fluid through orifice 68 from the receiving chamber 66 into the reservoir 52. Pressure from fluid in the reservoir 52 and the rigidity of the arm 82 maintain the seal at orifice 68 when an engine is not running and the clutch assembly 14 is not rotating. The flapper valve assembly 80 prevents the migration of fluid from the reservoir 52 into the receiving chamber 66 and the shear zone 48.

A second preferred embodiment of a pump plate assembly, indicated generally at 90, is illustrated in FIGS. 5-7. For purposes of clarity, like elements will be indicated with like reference numerals.

A pair of thin, flat wiper pump elements 92 are secured to the rear surface 38A of the pump plate 38 by any suitable means, e.g., welding. Each wiper pump 92 includes a curved, fluid scoop surface 94. An orifice 96, preferably in the shape of a slot, is provided adjacent the scoop surface 94 of each wiper 92. The scoop surface 94 provides a fluid dam and enhances the pumping of fluid through the orifice 94. A flapper valve assembly 80 is provided to seal each orifice 96 and permit the one-way passage of fluid as described above.

Figure 8:
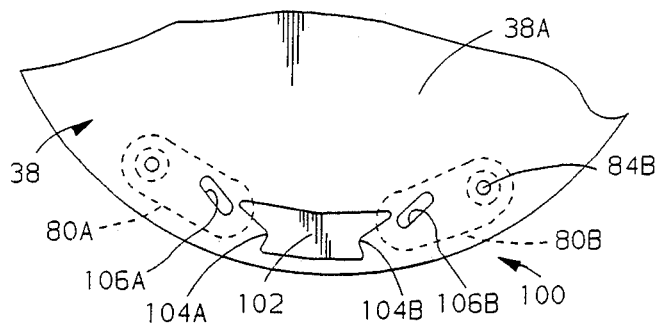
FIG. 8 is a partial top plan view of a third embodiment of the present pump plate assembly illustrating a pump plate for use with either a clockwise of a counter-clockwise clutch assembly, wherein the pump plate has orifices and flapper valve assemblies provided on each side of a wiper pump.

A third preferred embodiment of a pump plate assembly, indicated generally at 100, is illustrated in FIG. 8. Pump plate 38 is designed for use with either a clockwise or a counterclockwise fan and clutch assembly and includes at least one wiper 102 secured to its rear surface 38A. Wiper 102 includes a pair of opposite scope surfaces 104A and 104B. A pair of slot-like orifices 106A and 106B are provided adjacent each respective scoop surface 104A and 104B. A pair of flapper valve assemblies 80A and 80B are provided to seal each orifice 106A and 106B and permit one-way passage of fluid as described above.

Figure 9:
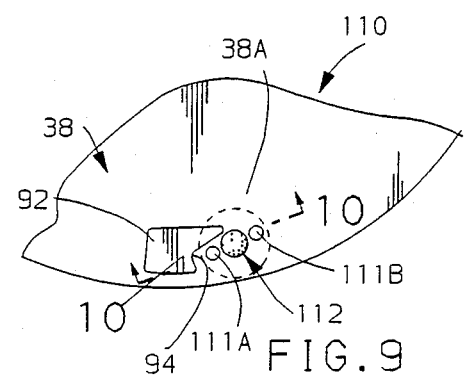
FIG. 9 is a partial top plan view of a fourth embodiment of the present pump plate assembly illustrating an umbrella valve inserted in an orifice.
Figure 10:
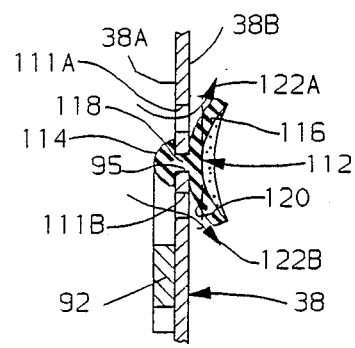
FIG. 10 is an enlarged sectional view taken along line 10—10 of FIG. 9 illustrating fluid flow through the umbrella valve.

A fourth embodiment of a pump plate assembly, indicated generally at 110, is illustrated in FIGS. 9 and 10. Pump plate 38 preferably includes at least one wiper 92 having scoop surface 94 as described above. An opening 95 and a pair of circular orifices 111A and 111B are provided in the pump plate 38 adjacent the scoop surface 94 of each wiper 92. An umbrella valve 112 includes a retainer 114 and a cap 116 connected by a cylindrical stem 118. The cap 116 and retainer 114 are formed so that their respective diameters are greater than the diameter of the opening 95, while the diameter of the stem 118 is approximately equal to the diameter of the opening 95. Furthermore, the diameter of cap 116 is large enough to provide a cover and seal for both orifices 111A and 111B. Preferably retainer 114, cap 116 and stem 118 are molded as an integral unit from a resilient material, e.g. rubber.

For assembly, the retainer 114 (preferably having a rounded outer surface) is inserted into the opening 95 and extends into the receiving chamber 66. The stem 118 is snugly fitted in the opening 95. Cap 116 includes smooth, flat surface 120 which forms a seal on the front surface 38B of pump plate 38. Fluid pressure in the reservoir 52 holds the cap 116 and the cap surface 120 against the pump plate front surface 38B until the pressure in the receiving chamber 66 exceeds fluid pressure in the reservoir 52, whereby the outer portions of cap 116 deflect to permit one-way fluid flow as indicated by directional arrows 122A and 122B from the receiving chamber 66 into the reservoir 52.

Figure 11:
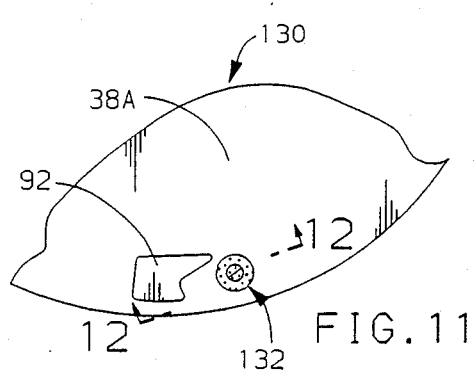
FIG. 11 is a partial top plan view of a fifth embodiment of the present invention illustrating a duckbill valve inserted in an orifice.
Figure 12:
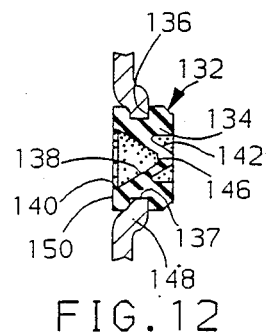
FIG. 12 is an enlarged sectional view taken along line 12—12 of FIG. 11.
Figure 13:
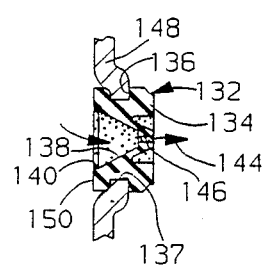
FIG. 13 is a sectional comparable to FIG. 12 illustrating fluid flow through the duckbill valve.

A fifth embodiment of a pump plate assembly, indicated generally at 130, is illustrated in FIGS. 11-13. A duckbill valve 132 includes a compressible, generally cylindrical portion 134 having a circumferential groove 136 for receiving the pump plate 38 at a circular orifice 137. A generally conical chamber 138 having an inlet 140 in communication with the receiving chamber 66 is provided in the cylindrical portion 134. Conical chamber 138 terminates in a normally-closed outlet formed at its vertex 142. When the fluid pressure in the receiving chamber 66 reaches a sufficient level, fluid in the conical chamber 138 forces the vertex 142 open so that fluid can flow, as indicated by directional arrows 144, through an aperture 146.

It is preferred that duckbill valve 132 be molded from a resilient material, e.g. rubber. Preferably, orifice 137 is provided in a depression 148 formed in pump plate 38 by stamping or the like so that the upper end surface 150 of the duckbill valve 132 is substantially flush with the rear surface 38A of pump plate 38 so as not to impede the flow of fluid into the conical chamber 138.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A pump plate assembly for separating a receiving chamber and a reservoir of a viscous fluid clutch, wherein the receiving chamber receives fluid from a shear zone, the pump plate assembly comprising:
   (a) a plate member having a front surface in communication with the reservoir and a rear surface in communication with the receiving chamber;
   (b) wiper means provided on the plate rear surface and projecting into the receiving chamber;
   (c) at least first and second openings provided in the plate member on opposite circumferential sides of the wiper means for permitting the passage of a fluid from the receiving chamber to the reservoir;
   (d) a first resilient arm having first and second ends, wherein the first end is secured to the plate front surface so that a planar surface of the second end covers and seals the first opening; and
   (e) a second resilient arm having first and second ends, wherein the first end is secured to the plate front surface so that a planar surface of the second end covers and seals the second opening;
   whereby, depending upon the direction of rotation of the pump plate, one of the resilient arms provides only one-way fluid flow from the receiving chamber to the reservoir at predetermined fluid pressures in the receiving chamber throughout the entire temperature range of the fluid.

2. A bladed fan and viscous fluid clutch assembly for inducing a flow of cooling air through a radiator in which engine coolant is circulated, the assembly comprising:
   (a) an input shaft adapted to be rotatably driven;

(b) a clutch plate, rotatably driven by the input shaft, having a plurality of axially extending and concentric lands forming grooves therebetween,
(c) a body, rotatably mounted on the input shaft, having a plurality of axially extending and concentric lands forming grooves therebetween, the body lands and grooves mated with the clutch plate lands and grooves to form a shear zone,
(d) axial flow passages in the lands and grooves of the clutch plate to permit the flow of a viscous fluid from a reservoir to the shear zone;
(e) a pump plate mounted within the body for separating the reservoir from a receiving chamber, the receiving chamber receiving fluid exiting from the shear zone;
(f) wiper means provided on a pump plate surface in communication with the receiving chamber and projecting into the receiving chamber;
(g) orifice means comprising at least a pair of openings provided in the pump plate on opposite circumferential sides of the wiper means for permitting the passage of fluid from the receiving chamber to the reservoir;
(h) a first resilient arm secured at a first end to a pump plate surface in communication with the reservoir so that a planar surface at a second end covers and seals one of the openings, thereby providing only one-way fluid flow from the receiving chamber to the reservoir at predetermined fluid pressures in the receiving chamber throughout the entire temperature range of the viscous fluid when the clutch assembly is operated in a first rotational direction; and
(i) a second resilient arm secured at a first end to the pump surface in communication with the reservoir so that a planar surface at a second end covers and seals the other opening, thereby providing only one-way fluid flow from the receiving chamber to the reservoir at predetermined fluid pressures in the receiving chamber throughout the entire temperature range of the viscous fluid when the clutch assembly is operated in an opposite rotation direction.

* * * * *